Patented Aug. 23, 1949

2,480,092

UNITED STATES PATENT OFFICE 2,480,092

WATER-DISPERSIBLE TITANIUM DIOXIDE

Walter R. Whately, Lynchburg, Va., assignor to American Cyanamid Company, New York, N. Y., a corporation of Maine No Drawing. Application April 3, 1946
Serial No. 659,423

7 Claims. (Cl. 23—202)

This invention relates to the production of titanium dioxide pigments, and relates more particularly to the production of water-dispersible titanium dioxide pigments of extremely fine texture.

Ordinarily, titanium dioxide is precipitated by hydrolysis as the hydrous oxide from sulfate, chloride, or other salt solutions, and is calcined at relatively high temperatures, as from about 700° to about 1100° C., to develop pigment properties. This calcination process produces aggregates of pigment particles which are subjected to milling or pulverizing treatment to break down the aggregates to the desired particle size. The preferred practice includes the wet milling of the pigment, followed by hydroclassification of the pigment to remove undesirably large particles. The hydroclassification treatment is usually carried out with a relatively dilute aqueous slurry of the pigment, and the approximately optimum-sized pigment particles are present in deflocculated, difficultly filterable condition. It is therefore necessary to flocculate the pigment particles to facilitate filtration and washing treatment. The flocculating treatment is ordinarily carried out by means of addition to the slurry of acidic materials such as mineral acids, acid-reacting salts thereof, or with a combination of such acidic materials. It has heretofore been necessary to employ relatively large quantities of alkaline materials to neutralize the flocculation media inasmuch as it is usually desired that the finished pigment be substantially neutral.

Previously known methods have been productive of titanium dioxide pigments having good texture characteristics and which, after washing, drying, and pulverizing treatment, have been satisfactory for many purposes such as for use in paints employing various drying oils as vehicles. However, titanium dioxide pigments produced according to such methods have been quite unsuitable for use in paints and the like materials wherein water constitutes the vehicle. The reason for this is that the so-produced pigments, after having been hydroclassified and flocculated, are no longer water-dispersible, due apparently to retention by the pigments of a portion of the flocculant, or salt thereof. The presence of even a very small amount of such flocculant evidently prevents the pigments from deflocculating when added to water, thus rendering the pigments unfit for use as water-dispersible materials.

It is therefore a primary object of this invention to provide a method for the production of hydroclassified titanium dioxide pigments which are readily redispersible in water.

Another object of the invention resides in the provision of a method whereby the cost of such pigment production is substantially decreased. Further objects of the invention will be readily apparent to those skilled in the art from the following detailed description.

I have discovered that hydrolyzable titanium salts may advantageously be employed as flocculants for aqueous dispersions of hydroclassified titanium dioxide pigments. Such salts embrace both organic and inorganic hydrolyzable salts of titanium and include titanium sulfate, titanium chloride, titanium nitrate, titanium oxalate, and similar salts.

In its broader aspect my invention contemplates the addition of a small amount of a hydrolyzable titanium salt to an aqueous slurry of hydroclassified titanium dioxide whereupon the hydroclassified pigment material is flocculated and may be more easily handled in subsequent operations. I have discovered that, most unexpectedly, if the titanium salt-containing mixture is heated so as to hydrolyze and flocculate the titanium salt as $TiO_2$, the so-flocculated $TiO_2$ does not interfere with subsequent redispersion in water of the hydroclassified titanium dioxide pigment. It is, therefore, unnecessary to remove the flocculant from the pigment material before filtration thereof.

By employing hydrolyzable titanium salts, I have found that the amount of acid necessary to promote flocculation of hydroclassified titanium dioxide pigments from aqueous dispersions thereof is appreciably reduced. Experimentation has shown that this reduction is approximately 50%, resulting in a considerable saving of raw material. In a typical treatment, carried out according to the method of the present invention, 100 parts of hydroclassified titanium dioxide pigment were flocculated by the addition, to a water slurry thereof, of 7 parts of a dilute aqueous solution of titanium sulfate; the total amount of free and combined $H_2SO_4$ employed was 0.175% based on the weight of pigment material, and the final pH of the mixture was 3.0. When the same amount of hydroclassified titanium dioxide pigment was flocculated from a water slurry by addition of a dilute solution of $H_2SO_4$, it was necessary to employ 13 parts of the acid solution to attain complete flocculation of the pigment; the amount of $H_2SO_4$ employed was 0.325% based on the weight of pigment material, and the final pH of the mixture was 2.5.

An additional, and economically important, feature of my invention resides in the fact that, due to precipitation of the flocculant as an insoluble, pigment-compatible compound with formation of an equivalent amount of free acid, most of the acid present may be removed from the mixture by filtering and washing, thus substantially decreasing the amount of alkali necessary for neutralization of the pigment material. Ordinarily, about 80–85% or more of the free acid present in the mixture may be removed by such treatment. Thus it will be readily apparent that the amount of alkali necessary to obtain a neutral pigment is very greatly reduced by my novel method.

In a preferred embodiment of the invention, calcined titanium dioxide which has been slurried with about 5 to 10 times its weight of water and has been wet milled or otherwise reduced to the desired particle size, is hydroclassified to remove particles of 4 microns diameter or larger. To this slurry is added an amount of hydrolyzable titanium salt in excess of about 0.1% of the weight of titanium dioxide present. The upper limit of the amount of flocculant is not critical, but as it is usually desirable to avoid excessive quantities that would cause dusting or chalking, amounts in excess of about 2% are seldom used. I prefer to add the titanium salt in amounts of about 0.1%, based on the weight of the calcined $TiO_2$.

Upon adding the titanium salt the flocculation of the pigment material proceeds quite rapidly and after its completion or during such flocculation, if desired, the mixture is heated to boiling in order that the titanium salt may be hydrolyzed. The hydrolysis treatment serves to precipitate the titanium of the salt as $TiO_2$, and produces an equivalent amount of free acid according to the titanium salt employed. The material is then filtered, washed, dried, milled, and pulverized. If it is desired that the finished pigment be entirely neutralized, a small amount of alkali may be added to the mixture at any point before the pigment is dried. The titanium dioxide pigment obtained is easily redispersible in water and may advantageously be employed wherever such properties are desirable.

In order that the invention may be more easily understood, the following specific examples are given. It is to be understood, however, that the examples are intended for purposes of illustration only, the limits of the invention being defined by the appended claims.

Example 1

1000 g. of calcined $TiO_2$ was micropulverized and dispersed in 5 liters of water. The slurry was allowed to stand for about 1½ hours, this being the time calculated to settle out all particles larger than 4 microns in diameter. After decantation, 5000 g. of slurry was obtained, the slurry having a specific gravity of 1.12 and containing 720 g. of $TiO_2$. To this hydroclassified slurry was added 3.6 gm. of $TiO_2$ and 10.8 gm. of $H_2SO_4$ in the form of a 10% titanium sulfate solution. The slurry was heated to boiling, and the boiling was continued for 30 minutes, at which time the titanium sulfate had been completely hydrolyzed. To the mixture was added 10% NaOH solution until a pH of 7.0 was attained. The slurry was then filtered, washed with 1 liter of water, dried at 130° C., milled and pulverized. The pigment obtained was of extremely fine texture and possessed a high degree of water dispersibility. Water dispersion of this pigment was rated as 86.3%. The water dispersion rating was calculated by dispersing 25 grams of the flocculated hydroclassified $TiO_2$ in 250 ml. of water in a graduated cylinder. The dispersion was allowed to stand for 4 hours, after which the top 50 ml. was removed with a pipette. The pigment contained in this portion was flocculated, filtered, and thereafter analyzed to ascertain the amount of the pigment which remained dispersed in the water after the 4 hour period.

Example 2

The procedure followed was similar to that of Example 1 except that after the boiling operation, the slurry was filtered and washed before the addition of NaOH. The amount of NaOH necessary to neutralize the pigment was reduced by about 82%.

Example 3

1250 g. of calcined titanium dioxide was dry ground, micropulverized and dispersed in 5000 ml. of water. This slurry was hydroclassified to a maximum particle size of 4 microns. The resulting slurry contained 200 g. per liter of $TiO_2$. 1 liter of this classified slurry was flocculated by the addition of 0.5% $TiCl_4$ based on the amount of titanium dioxide pigment. The flocculated slurry was boiled for 30 minutes, neutralized with NaOH solution, filtered, and washed. The pigment was dried at 130° C., dry milled, and pulverized. The pigment obtained was of extremely fine texture, had good color, and its tinting strength was 1600. Its water dispersion rating was 79.9%.

Example 4

The procedure followed was similar to that of Example 3 except that 0.5% titanium nitrate was substituted for the titanium chloride. The color of the pigment obtained was very satisfactory, the tinting strength of the pigment was 1610, and the water dispersion rating was 83.4%.

Example 5

The procedure followed was similar to that of Example 3 except that 0.5% titanium oxalate was substituted for the titanium chloride. The color and texture of the pigment obtained was quite satisfactory, the tinting strength of the pigment was 1590, and the water dispersion rating was 88.5%.

It will be apparent from the aforegoing detailed description that the process of my invention provides an economical means of producing water-dispersible titanium pigments.

Ordinarily, a major portion of the uncalcined $TiO_2$ precipitated during the hydrolysis of the titanium salt flocculants is carried along by the pigment. It is an important advantage of the invention that the titanium salts used as flocculating agents, being converted to $TiO_2$ by hydrolysis by the subsequent heating, do not impair the texture or tinting strength of the pigment. Tinting strengths of 1500–1600, as have been shown to be obtained by the method of my invention, are accepted in the art as being indicative of outstanding pigment characteristics.

I claim:

1. In a process for the production of water-dispersible titanium dioxide pigments, the step comprising the flocculation of water-dispersed hydroclassified micropulverized calcined titanium dioxide by the addition thereto of a small amount not greater than 2%, based on the weight of the calcined titanium dioxide, of a hydrolyzable titanium salt.

2. In a process for the production of water-dispersible titanium dioxide pigments the step comprising the flocculation of water-dispersed hydroclassified micropulverized calcined titanium dioxide by the additional thereto from about 0.1% to about 2% of a hydrolyzable titanium salt, based on the weight of the calcined titanium dioxide.

3. A process for the production of water-dispersible titanium dioxide pigments which comprises the steps of adding to a water dispersion of a hydroclassified micropulverized calcined titanium dioxide a small amount not greater than 2%, based on the weight of the calcined titanium dioxide of a hydrolyzable titanium salt, boiling the mixture until the titanium salt has been substantially completely hydrolyzed, filtering the mixture, washing the filter cake with water, and drying, milling, and pulverizing the resulting titanium dioxide pigment.

4. A process for the production of water-dispersible titanium dioxide pigments which comprises the steps of adding to a water dispersion of hydroclassified micropulverized calcined titanium dioxide from about 0.1% to about 2% of a hydrolzable titanium salt, based on the weight of the calcined titanium dioxide, boiling the mixture until the titanium salt has been substantially completely hydrolyzed, filtering the mixture, washing the filter cake with water, and drying, milling, and pulverizing the resulting titanium dioxide pigment.

5. A process for the production of water-dispersible titanium dioxide pigments which comprises flocculating water-dispersed hydroclassified calcined titanium dioxide by the addition thereto of a small amount not greater than 2% of titanium sulfate, based on the weight of the calcined titanium dioxide, and thereafter heating the mixture until the titanium salt has been substantially completely hydrolyzed.

6. A process for the production of water-dispersible titanium dioxide pigments which comprises flocculating water-dispersed hydroclassified calcined titanium dioxide by the addition thereto of a small amount not greater than 2% of titanium tetrachloride, based on the weight of the calcined titanium dioxide, and thereafter heating the mixture until the titanium salt has been substantially completely hydrolyzed.

7. A process for the production of water-dispersible titanium dioxide pigments which comprises flocculating water-dispersed hydroclassified calcined titanium dioxide by the addition thereto of a small amount not greater than 2% of titanium oxalate, based on the weight of the calcined titanium dioxide, and thereafter heating the mixture until the titanium salt has been substantially completely hydrolyzed.

WALTER R. WHATELY.

No references cited.